(No Model.)

C. F. MURDOCK.
STOP VALVE.

No. 291,218. Patented Jan. 1, 1884.

Witnesses:
A. Barthel
Ter Sully

Inventor:
Charles F. Murdock

N. PETERS. Photo-Lithographer, Washington, D. C.

UNITED STATES PATENT OFFICE.

CHARLES F. MURDOCK, OF DETROIT, MICHIGAN.

STOP-VALVE.

SPECIFICATION forming part of Letters Patent No. 291,218, dated January 1, 1884.

Application filed April 6, 1883. (No model.)

*To all whom it may concern:*

Be it known that I, CHARLES F. MURDOCK, of the city of Detroit, county of Wayne, and State of Michigan, have invented certain Improvements in Stop-Valves, of which the following is a specification.

At the present state of the art the valve-gates used for such valves are usually constructed in two parts and made adjustable to their valve-seats. A disadvantage incurred in these constructions is that such valves require a greater distance between their valve-seats than is required for solid gates, owing partly to their peculiar mode of adjustability, and partly to the necessity of giving to each of the two parts constituting the gate the necessary strength to withstand heavy pressures without springing from their seats.

The main object of my improvement is to do away with the increase in thickness of the two-part valve-gate which arises from the above accounts, by employing a mode of adjustability which allows each part of the valve-gate to be supported by the whole strength of the other part, so as to act under pressure like a solid gate, and, further, allows me to diminish the distance between the valve-seats even beyond that required for a solid gate. The benefit resulting from such construction is a more compact and therefore less weighty valve.

Figure 2:
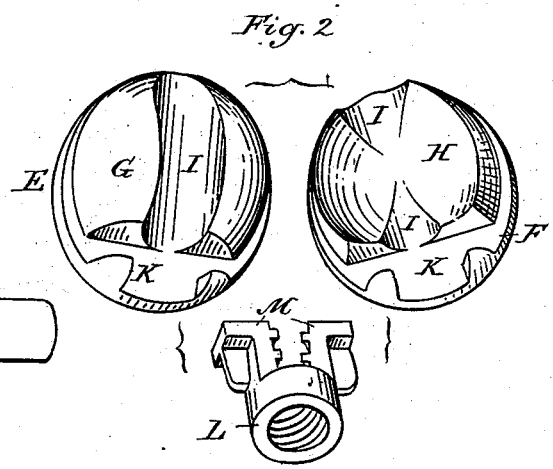
Figure 1:
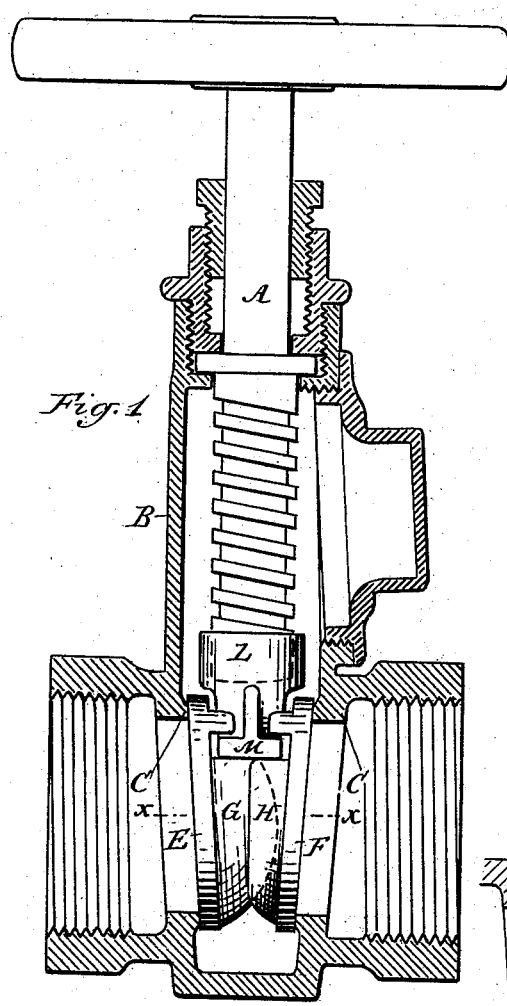
Figure 3:
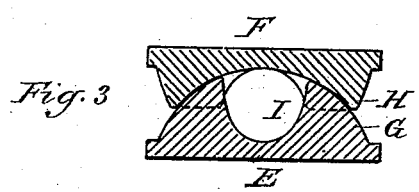
Figure 4:
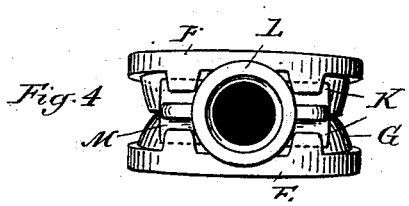
Figure 5:
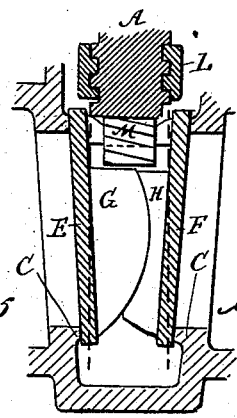

In the drawings which accompany this specification, Figure 1 is a vertical central section of my improved gate or stop-valve, with the gate closed. Fig. 2 is a detached perspective view of the different parts of the valve-gate. Fig. 3 is a cross-section of the valve-gate on line *x x* in Fig. 1. Fig. 4 is a top view of the valve-gate detached from the valve-stem. Fig. 5 is a vertical central section of the valve-gate closed upon the valve-seats.

In Fig. 1 of the drawings my improved valve-gate is shown in elevation and closing the throughway of a valve of otherwise known construction and operation.

A is the valve-stem; B, the valve-case, and C C the valve-seats, which are both slightly inclined.

The valve-gate proper consists of the two parts E and F, which are shown detached in Fig. 2. The outer face of each of these parts presents the ordinary valve-face for closing the opening in each of the valve-seats C; but their backs, which abut directly against each other, are formed spherically—that is, one is provided with a spherically convex back, G, and the other with a spherically concave one, H, which fit each other exactly.

L is a screw-nut adapted to engage with the screw-thread upon the stem A. Its lower end is provided with the wings M, which form an integral part of the nut.

The backs G and H of the parts E F are correspondingly recessed, as at I, to form a passage for the stem A when the gate is raised. K K are other corresponding grooves in the backs of each of the parts E and F and near the upper ends thereof. The wings M of the nut L engage with these grooves, as shown in the drawings, so that when the nut L is raised or lowered by actuating the valve-stem A the gate will move correspondingly without being interfered in the perfect freedom of its parts to adjust themselves to the valve-seats C C or draw apart when the gate is raised, so as to allow the stem A to enter between the parts E and F. Such a drawing apart of the lower ends of the parts E and F when the gate is raised will be necessary in the valve-gate shown in Fig. 5, as the passage provided is not large enough to allow the stem to pass, and when the gate is raised the valve-stem, on entering between the parts E and F, will adjust the valve-faces so as to allow its passage.

In a solid gate the passage-way has to be made large enough to allow the stem to pass into and through the gate when the same is raised; and it will now appear clear why in my improvement the gate may be made of less thickness than if made solid.

As the back G of the part E is a spherical segment fitting into the socket H of the part F, the adjustability of the gate is perfect, and, owing to the positive manner in which the two parts E and F are lowered upon their seats by means of the nut L engaging with its wings M into the slots K, the backs or meeting faces of the two parts of the gate can never come out of perfect contact.

What I claim as my invention is—

1. In a stop-valve, an adjustable valve-gate with inclined faces, made in two parts, which are disconnected from but abut against and support each other upon their rear surfaces, which in one part forms a spherical segment, with a semi-spherical stemway formed therein, and in the other a corresponding socket, substantially as and for the purposes described.

2. In a stop-valve, an adjustable valve-gate, the two parts of which have segmental ball-and-socket abutments upon their backs or meeting faces, central passage-way, I, and corresponding grooves K upon each part, in combination with the winged nut L, all combined and constructed substantially as and for the purposes described.

3. In a stop-valve, an adjustable valve-gate made in two disconnected parts, the abutting faces of which form a ball-and-socket joint, the center bearing portion of which is cut away, substantially as set forth.

4. In a stop-valve, an adjustable valve-gate made in two parts, the abutting faces of which form a ball and-socket bearing, through the spherical segment of which bearing is a semi-spherical slotted stemway, in combination with the winged nut provided with means for connecting it to the gate, the parts being constructed to operate substantially as and for the purposes described.

5. In a stop-valve, a gate consisting of two valve-disks provided with a spherical joint, and forming a wedge-shaped gate when closed, in combination with a nut through which the stem is threaded, the body of said nut being outside the body of the valve-gate, said nut being provided with wings or flanged at the lower end thereof, which engage with the grooves in the valve-disks near the top thereof, said grooves being larger than the entering wings, so that in operating the gate the valve-disks are adapted to draw apart upon their lower ends when the gate is raised and adjust themselves to the valve-seats when closed, substantially as and for the purposes set forth.

CHARLES F. MURDOCK.

Witnesses:
J. T. STERLING,
JOHN W. SCOFIELD.